(12) United States Patent
Ju

(10) Patent No.: US 9,206,633 B1
(45) Date of Patent: Dec. 8, 2015

(54) HINGE STRUCTURE

(71) Applicant: LEECO Technologies Corporation, New Taipei (TW)

(72) Inventor: Danny Ju, Taipei (TW)

(73) Assignee: LEECO TECHNOLOGIES CORPORATION, New Taipei (TW)

( * ) Notice: Subject to any disclaimer, the term of this patent is extended or adjusted under 35 U.S.C. 154(b) by 0 days.

(21) Appl. No.: 14/603,543

(22) Filed: Jan. 23, 2015

(51) Int. Cl.
| | |
|---|---|
| *E05D 11/08* | (2006.01) |
| *E05D 11/10* | (2006.01) |
| *E05D 3/02* | (2006.01) |
| *E05D 5/10* | (2006.01) |

(52) U.S. Cl.
CPC .............. *E05D 11/1042* (2013.01); *E05D 3/02* (2013.01); *E05D 5/10* (2013.01); *E05D 2005/106* (2013.01); *E05Y 2900/606* (2013.01)

(58) Field of Classification Search
CPC ...................... Y10T 16/54038; Y10T 16/5403; E05D 11/08; E05D 11/081; E05D 11/082; E05D 11/087; E05D 11/084; E05D 11/105; E05D 2011/1035
See application file for complete search history.

(56) References Cited

U.S. PATENT DOCUMENTS

| | | | | |
|---|---|---|---|---|
| 6,467,129 | B1 * | 10/2002 | Bae ................................. | 16/342 |
| 6,530,123 | B1 * | 3/2003 | Wahlstedt ...................... | 16/342 |
| 2002/0144378 | A1 * | 10/2002 | Liao ............................... | 16/342 |
| 2002/0162192 | A1 * | 11/2002 | Su-Man .......................... | 16/337 |
| 2003/0000046 | A1 * | 1/2003 | Liao ............................... | 16/307 |
| 2007/0094845 | A1 * | 5/2007 | Chang et al. .................... | 16/342 |
| 2007/0186382 | A1 * | 8/2007 | Huang ............................ | 16/293 |
| 2007/0214605 | A1 * | 9/2007 | Tu .................................. | 16/342 |
| 2007/0234517 | A1 * | 10/2007 | Larson et al. .................. | 16/342 |
| 2008/0263826 | A1 * | 10/2008 | Huang ............................ | 16/342 |
| 2009/0282645 | A1 * | 11/2009 | Lee ................................. | 16/248 |
| 2009/0293229 | A1 * | 12/2009 | Chiang .......................... | 16/342 |
| 2009/0311073 | A1 * | 12/2009 | Lee ............................... | 411/209 |
| 2010/0125976 | A1 * | 5/2010 | Kuo et al. ....................... | 16/348 |
| 2011/0232034 | A1 * | 9/2011 | Chu et al. ....................... | 16/297 |
| 2011/0314636 | A1 * | 12/2011 | Chen .............................. | 16/319 |
| 2014/0059805 | A1 * | 3/2014 | Krahn et al. ................... | 16/342 |
| 2014/0338483 | A1 * | 11/2014 | Hsu et al. ........................ | 74/96 |

FOREIGN PATENT DOCUMENTS

| | | |
|---|---|---|
| TW | 420321 | 5/1988 |
| TW | M388814 U1 | 9/2010 |

* cited by examiner

*Primary Examiner* — Chuck Mah
(74) *Attorney, Agent, or Firm* — Bacon & Thomas, PLLC

(57) ABSTRACT

An improved hinge structure, comprising: a fixed base, a hinge and at least a set of positioning torque shrapnel; wherein the internal of the fixed base is provided with an irregular-shaped axle hole; one end of the hinge is an insert ends whose outer surface is provided with a protruding sector portion and a recessed planar portion; the positioning torque shrapnel is provided with a through hole for the insert end of the hinge to pass through. The internal wall of through hole is provided with a passive protruding portion and a passive plan portion that can be respectively engaged with the protruding sector portion and the plan portion on the insert end of the hinge; accordingly, when rotating the hinge, the effect of positioning and generating a torque can be achieved.

8 Claims, 6 Drawing Sheets

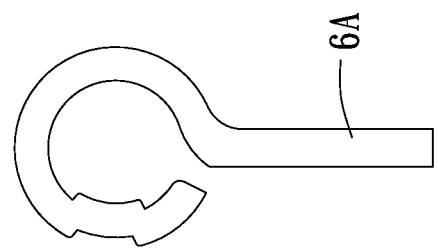
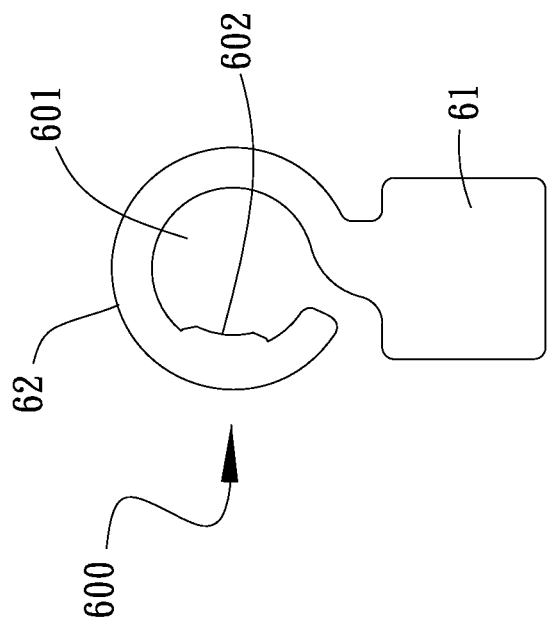
Fig. 3A
Fig. 3B

HINGE STRUCTURE

BACKGROUND OF THE INVENTION

1. Field of the Invention

The utility model relates to an improved hinge structure, particularly to an improved hinge structure that can achieve the effect of positioning and generating a torque through a positioning torque shrapnel interposed therebetween when a hinge rotates within an axle hole of a fixed base.

2. Description of the Related Art

All electronic products available in the market today, such as laptop, mobile phone, translation machine, and PDA (personal digital assistant), have a main body and a screen that can be hinged or rotated by a certain angle relative to the main body. To achieve the effect of the aforementioned hinge or rotating by a certain angle, the invention of a hinge or a rotating-axle structure is provided.

For example, ROC Patent No. 420321 has disclosed a fixed base, a hinge, a positioning plate, and a tube spring, wherein the fixed base and hinge can be disposed in the main body and computer screen respectively. One side of the fixed base is formed with a connection hole. An ⊥-shaped-groove is provided and connected to the lateral side of the connection hole. One end of the tube spring in a sheet form is a straight plate and a protruding portion is formed at one end of the straight plate. The opposite end of the tube spring is a hollow tube in which a hinge hole is available for one end of the hinge to insert therethrough. The aforementioned tube spring can be disposed at the connection hole and positioned within the ⊥-shaped groove.

However, the assembled structure of the patent application is too complicated and may require high manufacturing costs. Furthermore, any part abrasion would affect the overall functionality.

Further, ROC Patent No. M388814, as shown in FIG. 1, has disclosed: a rotating-axle structure having the characteristic of elastic abutting and positioning, which is provided with a hinge tube. A hinge is disposed throughout the hinge tube. A fixed portion is provided in the hinge tube. The outer periphery of the hinge is provided with a positioning portion which can be positioned with the fixed portion. Below the hinge shaft 100, the hinge is provided with an abutting element 200 having the elastic deflection and elastic displacement feature. One end of the abutting element 200 is formed with an abutting portion 201. The outer periphery of the hinge shaft 100, on one side of the positioning portion, is provided with a recess 101. The abutting portion 201 abuts against the inside of the recess 101. With the use of the elastic displacement capability of the abutting element 200, the hinge tube and the hinge shaft 100 can be operated together and positioned and push the hinge shaft 100 to eliminate the gap between the hinge tube and the hinge shaft 100, by which the hinge is positioned more stably, and the object with a hinge does not produce shaking in the positioned state.

However, in the patent application, the abutting element with the elastic deflection and elastic displacement feature is disposed below the hinge and has the easily broken problem.

In view of the foregoing shortcomings in the prior art, the inventor studied a variety of methods based on manufacturing experiences and skills accumulated for various shafts, and finally designed and developed a brand-new improved hinge structure according to the utility model after continuous research, experiments and improvement to solve the aforementioned shortcomings in the prior art.

SUMMARY OF THE INVENTION

Therefore, it is an objective of the utility model to provide an improved hinge structure which achieves the effect of positioning and generates a torque when a hinge rotates within a fixed base.

In the improved hinge structure according to the utility model, on the fixed base, a positioning torque shrapnel is provided within an axle hole pivoted to the hinge. Through providing a passive protruding portion and a passive plan portion on the positioning torque shrapnel which are engaged with a protruding sector portion and a plan portion disposed on the hinge, the effect of positioning and generating a torque can be achieved. This is the secondary objective of the utility model.

The objective, shape, characteristics of the structure and effect of the structure and device will become apparent by reference to the following embodiment in conjunction with the accompanying drawings, which are described in detail hereinafter:

BRIEF DESCRIPTION OF THE DRAWINGS

FIG. 3A is a plan view of a torque shrapnel of the improved hinge structure according to the utility model;

FIG. 3B is a plan view of a torque shrapnel of the improved hinge structure according to another embodiment of the utility model;

DETAILED DESCRIPTION OF THE PREFERRED EMBODIMENT

Figure 1:
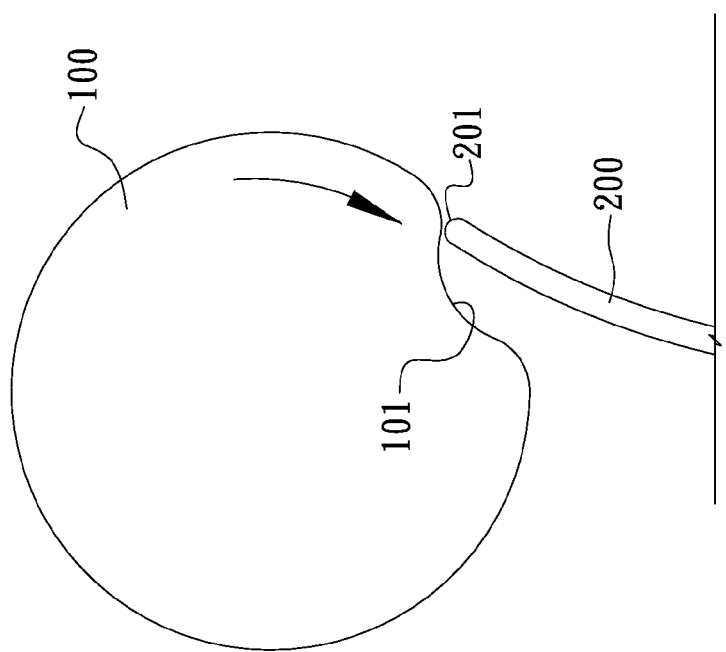
FIG. 1 is a schematic view showing the structure of ROC Patent No. M388814.
Figure 2A:
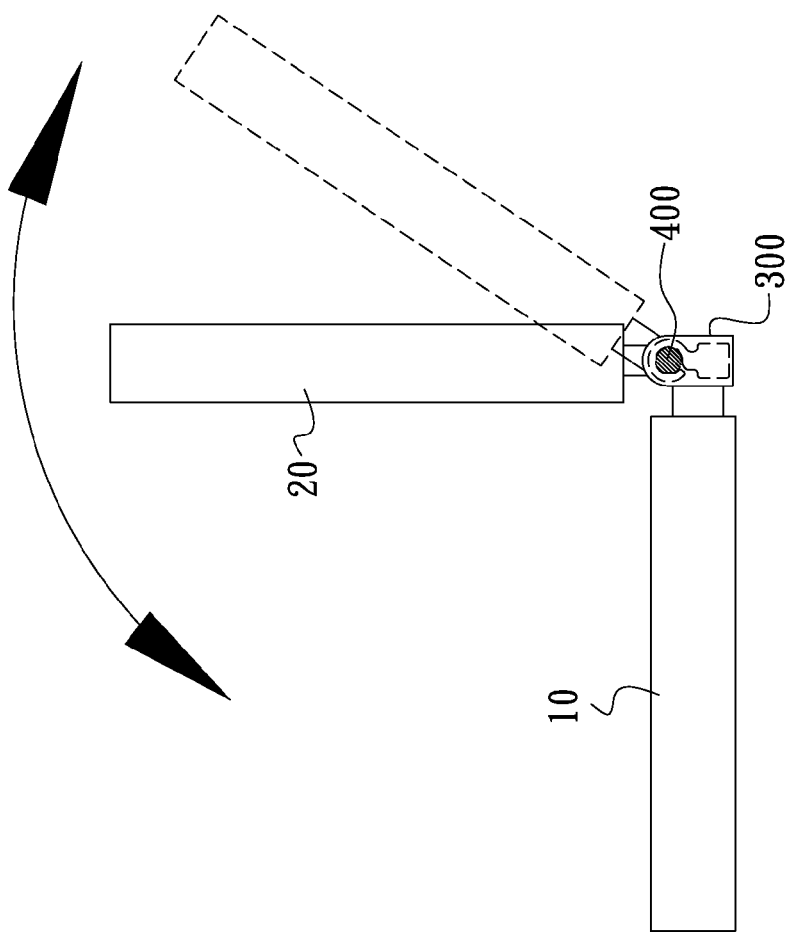
FIG. 2A is a schematic view showing the status of using an improved hinge structure according to the utility model.
Figure 2B:
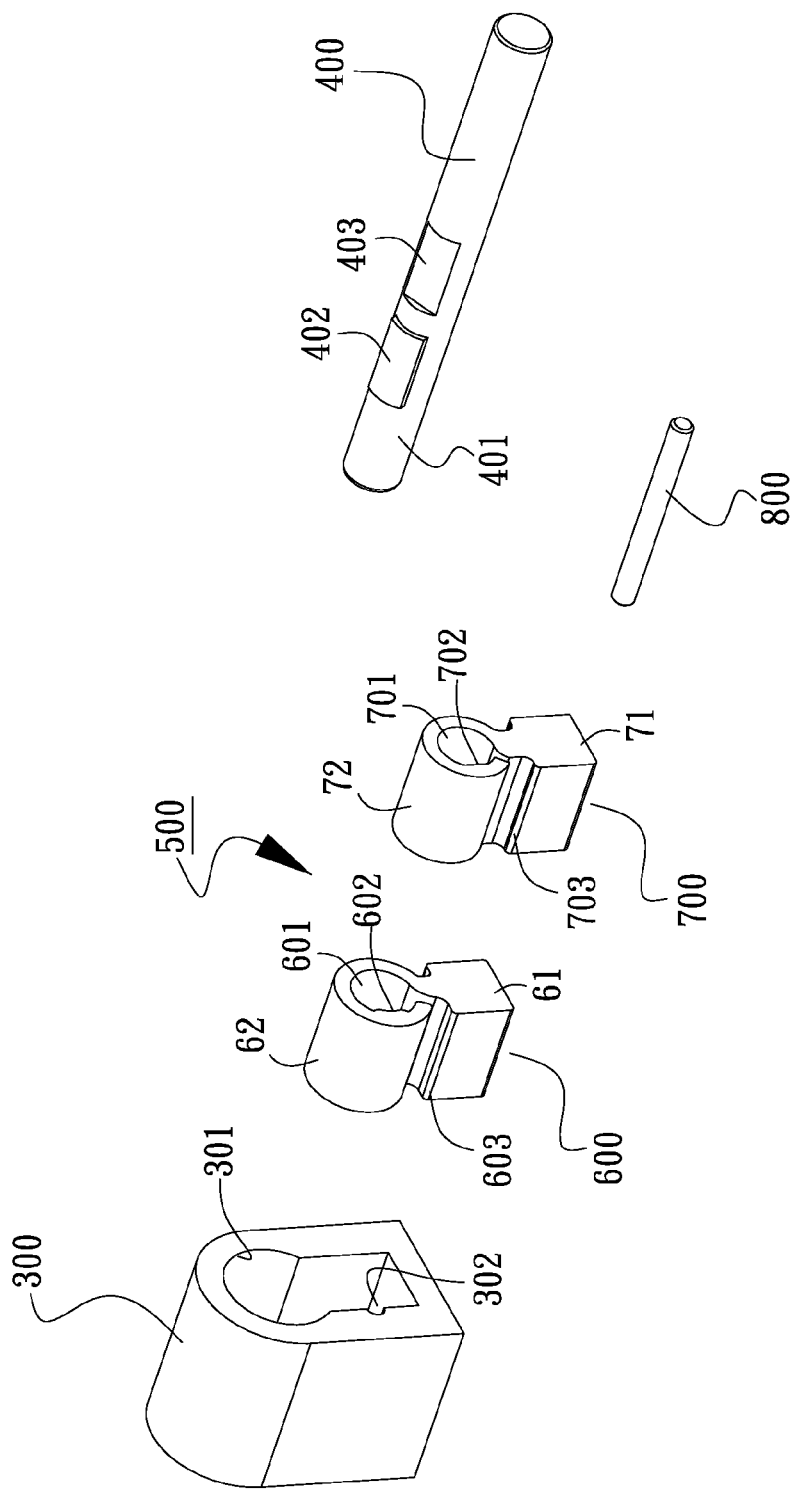
FIG. 2B is an exploded perspective view of the improved hinge structure according to the utility model.

Please refer to FIG. 2A and FIG. 2B for the "improved hinge structure" of the utility model, which includes: a fixed base 300, a hinge 400 and a positioning torque shrapnel 500;

wherein the fixed base 300 can be connected to a main body 10 of an electronic product such as the mobile phone and notebook computer; the internal of the fixed base 300 is provided with an axle hole 301 which is an irregular-shaped hole; an internal wall of the axle hole 301 is provided with a notch 302 formed in the axial direction of the axle hole 301;

The hinge 400 may be provided on the bottom of a lid 20 of the main body 10, such that the lid 20 is disposed on the main body 10 being closed and opened relative to the main body 10, or kept the positioning when rotated to an angle; one end of the hinge 400 is an insert end 401 on which a projecting outwardly protruding sector portion 402 and a recessed flat portion 403 are disposed.

The positioning torque shrapnel 500, which is a metal material with elasticity, is made up of a positioning shrapnel set 600 and a torque shrapnel set 700; the bottom of the positioning shrapnel set 600 and the torque shrapnel set 700 is provided with a wide base 61, 71, and its upper part is provided with a curved arc shrapnel 62, 72 with elasticity.

Figure 4B:
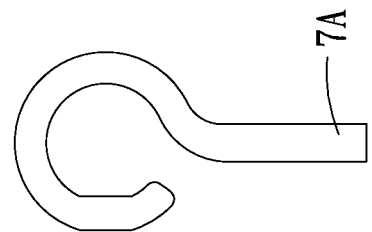
FIG. 4B is a plan view of a positioning shrapnel of the improved hinge structure according to another embodiment of the utility model.
Figure 4A:
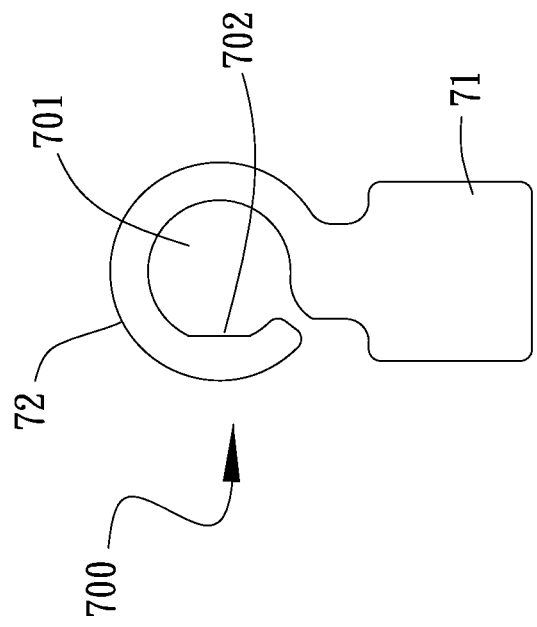
FIG. 4A is a plan view of a positioning shrapnel of the improved hinge structure according to the utility model.

Referring to both FIG. 3A and FIG. 4A, the center of the curved arc shrapnel 62, 72 on the positioning shrapnel set 600 and the torque shrapnel set 700 is provided with a through hole 601, 701 for the insert end 401 of the hinge 400 to pass through. A passive protruding portion 602 projecting to the hole is provided at the edge within the through hole 601 of the positioning shrapnel set 600; a passive plan portion 702 is provided at an edge within the through hole 701 of the torque shrapnel set 700; the surface of the passive protruding portion 602 is preferably formed with a slightly recessed sector; and the passive plan portion 702 is a straight portion.

As shown in the figures, the upper edge of the base 61, 71 on the positioning shrapnel set 600 and the torque shrapnel set 700 is formed with an engaging groove 603, 703. The engaging groove 603, 703 is formed in the axial direction of the base 61, 71. After the positioning shrapnel set 600 and the torque shrapnel set 700 are mounted into the axle hole 301 of the fixed base 300, through a latch 800 being inserted, the latch 800 can be disposed between the engaging groove 603, 703 and the notch 302 within the axle hole, such that the positioning shrapnel set 600 and the torque shrapnel set 700 are fixed into the axle hole 301 of the fixed base 300.

When the positioning shrapnel set 600 and the torque shrapnel set 700 are both fixed into the axle hole 301 of the fixed base 300. Also, after the insert end 401 of the hinge 400 passes through the through hole 601, 701 of the positioning shrapnel set 600 and the torque shrapnel set, when the hinge 400 is rotated to the protruding sector portion 402 on the insert end 401 and squeezed relative to the passive protruding portion 602 of the positioning shrapnel set 600, one end of the curved arc shrapnel 62 with elasticity is pushed outwards against the internal wall of the axle hole 301, thereby producing packing effect to the internal wall of the axle hole 301. Accordingly, through the assembly, the lid 20 of the hinge 400 can be freely rotated to a temporary position by the packing effect, that is, there is a state of torque generated.

When rotating the insert end 401 of the hinge 400 such that the plan portion 403 and the passive plan portion 702 of the torque shrapnel set 700 are relatively engaged, the effect of positioning can be achieved through the relative engagement of the plan portion 403 and the passive plan portion 702. That is, the rotation of the hinge 400 to a certain angle is the stationary state.

Please then refer to FIG. 3B and FIG. 4B, which are plan views of a positioning shrapnel set 600 and a torque shrapnel set 700 according to another embodiment. As shown in the figures, the bottom of the positioning shrapnel set 600 and the torque shrapnel set 700 may also be a vertical elongated base 6A or 7A. When the bottom is the vertical elongated base 6A, 7A, the axle hole of the fixed base may also need to be adjusted to a vertical elongated shape.

Figure 5:
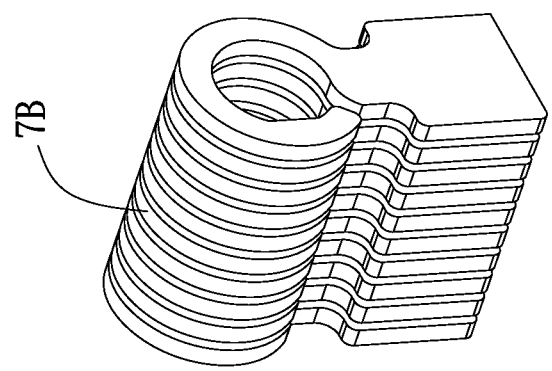
FIG. 5 is a perspective view of a set of torque shrapnel of the improved hinge structure according to a further embodiment of the utility model.
Figure 5:
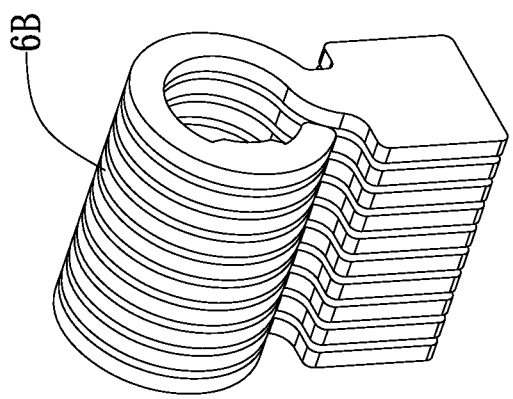

Please refer to FIG. 5, which is a perspective view of a positioning shrapnel set 600 and a torque shrapnel set 700 according to a further embodiment. As shown in FIG. 5, the positioning shrapnel set 600 and the torque shrapnel set 700 may be made up of a plurality of flaky shrapnel units 6B, 7B.

According to the above description, the improved hinge structure in the utility model provides a rapid overall assembly, and can produce a torque and the effect of positioning when the hinge is rotating, which not only significantly reduces the cost, but allows for easy maintenance.

As described above, the improved hinge structure in the utility model indeed has an unprecedented innovative structure, which is not found in any publication. Also, there are no similar products in the market. Therefore, the improved hinge structure possesses novelty undoubtedly. In addition, the utility model has unique features and functionality far from the others in the art. It is indeed more inventive than the others in the art, and meets the requirements of the application requirements of the new patent law. Accordingly, the patent application has been filed in accordance with patent law.

The described embodiments are merely preferred embodiments in the utility model, but the structure and characteristics of the utility model are not limited thereto. Various changes and modifications may be made to the described embodiments without departing from the scope of the utility model as disposed by the appended claims.

What is claimed is:

1. An improved hinge structure, comprising a fixed base, a hinge and a set of positioning torque shrapnel; wherein the fixed base can be assembled with a main body and the internal of the fixed base is provided with an axle hole; the hinge can be connected to a lid of the main body such that the lid is above the main body and closed and opened to an angle relative to the main body; the positioning torque shrapnel is mounted into the axle hole of the fixed base and provided with a through hole for the hinge to pass through; the improved hinge structure is characterized in that: one end of the hinge is an insert end which can be inserted into the through hole of the positioning torque shrapnel, and an outwardly protruding sector portion is provided on the insert end; an internal wall on a through hole of the positioning torque shrapnel is provided with a passive protruding portion which is projecting to the through hole to be engaged with the protruding sector portion; accordingly, when the hinge is rotated within the through hole of the positioning torque shrapnel, the lid is freely rotated to a temporary position by the relative packing between the protruding sector portion and passive protruding portion.

2. The improved hinge structure as claimed in claim 1, wherein a concave plan portion is further provided on the insert end of the hinge; the through hole on an internal wall of the positioning torque shrapnel is further formed with a passive plan portion that can be engaged with the concave plan portion; accordingly, when the hinge is rotated within the through hole of the positioning torque shrapnel, it can be fixed through the relative engagement of the concave plan portion and the passive plan portion.

3. The improved hinge structure as claimed in claim 1, wherein the protruding sector portion and a concave plan portion are formed on the insert end of the hinge at the same time.

4. The improved hinge structure as claimed in claim 1, wherein the positioning torque shrapnel includes a positioning shrapnel on which a passive protruding portion is formed on an internal wall of the through hole, and a torque shrapnel on which a passive plan portion is formed on the internal wall of the through hole.

5. The improved hinge structure as claimed in claim 1, wherein a notch is provided within the axle hole of the fixed base in the axial direction of the axle hole, such that when the positioning torque shrapnel is mounted into the axle hole of the fixed base, the positioning torque shrapnel is fixed into the axle hole of the fixed base through a latch inserted into the notch.

6. The improved hinge structure as claimed in claim 1, wherein the positioning torque shrapnel includes a base and an arc-shaped shrapnel.

7. The improved hinge structure as claimed in claim 1, wherein the positioning torque shrapnel includes a vertical elongated base and an arc-shaped shrapnel.

8. The improved hinge structure as claimed in claim 1, wherein the positioning torque shrapnel is made up of a plurality of flaky shrapnel units.

\* \* \* \* \*